J. E. OSBORNE.
STALK CUTTING ATTACHMENT FOR PLOWS.
APPLICATION FILED FEB. 21, 1912.
1,047,979.
Patented Dec. 24, 1912.
2 SHEETS—SHEET 1.
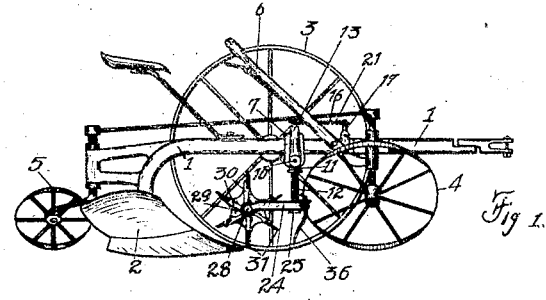
WITNESSES:
Earl M. Frankland
A. D. Stancliff.
INVENTOR
John E. Osborne
BY John M. Spellman
ATTORNEY J. E. OSBORNE.
STALK CUTTING ATTACHMENT FOR PLOWS.
APPLICATION FILED FEB. 21, 1912.

1,047,979.

Patented Dec. 24, 1912.

WITNESSES:
Earl M. Frankland
R. D. Stancliff

INVENTOR
John E. Osborne.
BY John M. Spellman.
ATTORNEY

UNITED STATES PATENT OFFICE.

JOHN E. OSBORNE, OF BRANDON, TEXAS.

STALK-CUTTING ATTACHMENT FOR PLOWS.

1,047,979. Specification of Letters Patent. Patented Dec. 24, 1912.

Application filed February 21, 1912. Serial No. 679,107.

*To all whom it may concern:*

Be it known that I, JOHN E. OSBORNE, citizen of the United States, residing at Brandon, in the county of Hill and State of Texas, have invented certain new and useful Improvements in Stalk-Cutting Attachments for Plows, of which the following is a specification.

This invention relates to new and useful improvements in stalk-cutters, and particularly to that class of stalk-cutters which employ a series of blades or knives mounted on arms radiating from a central hub, and adapted to rotate on an axle, due to the contacting of said blades with the ground.

An object of this invention is to provide a stalk-cutter attachment for an ordinary plow, in which the operation of stalk cutting and plowing may be carried on at the same time, and with the same equipment.

Another object is to provide a resilient connection between said stalk-cutter and the beam of the plow to which it is attached.

A further object of the invention is to provide a fender or stalk hook which employs the compression of a spring to hold it in position, but which will deflect from its normal position when any unusual obstruction is encountered, and which will be returned to said normal position by the spring.

The object is finally, to provide a stalk-cutter attachment for plows which will be strong, durable, comparatively easy to construct, and one in which the various parts are not likely to get out of working order.

Figure 3:
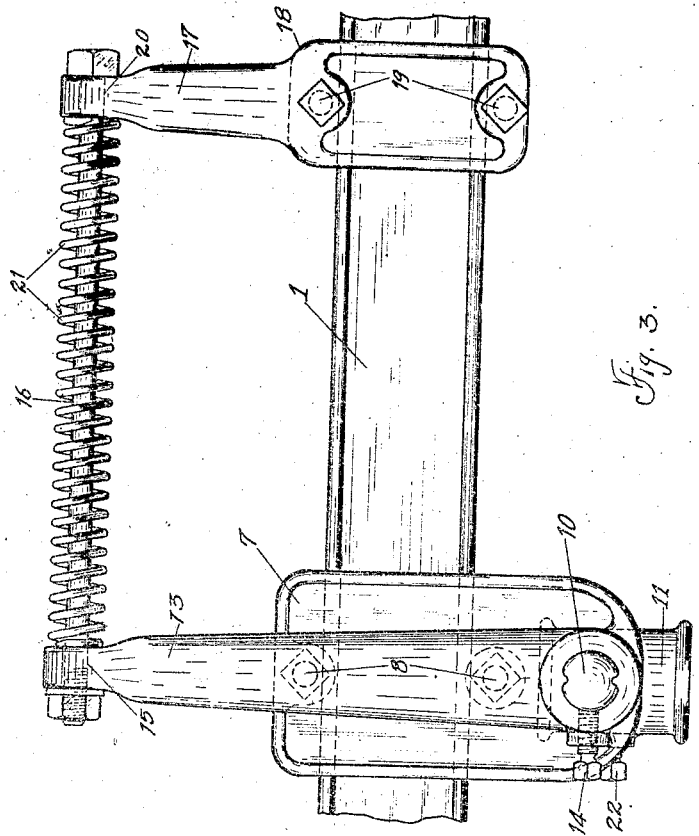
Figure 2:
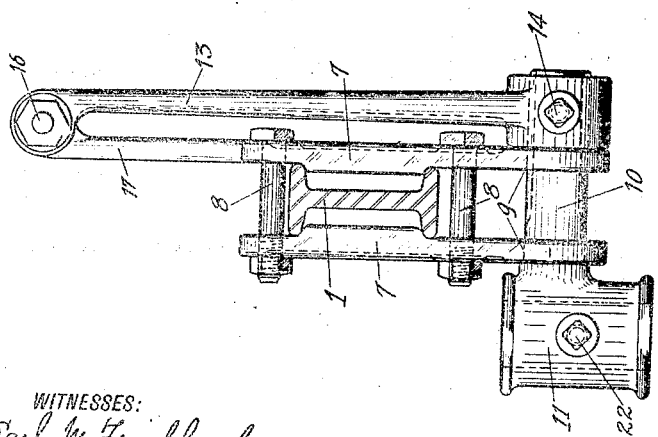

With these and various other objects in view, this invention has relation to certain novel features of the construction and operation, an example of which is described in the following specification, and illustrated in the accompanying drawings, wherein:

Figure 1 is a side elevation of a plow with the stalk-cutter attached. Fig. 2 is an end elevation of a portion of the plow beam with the pivoted socket and the spring-operated mechanism attached. Fig. 3 is a side view of the same. Fig. 4 is a side elevation of the cutter and cutter shank. Fig. 5 is an end elevation of the same. Fig. 6 is a section taken on the line A—A of Fig. 2. Fig. 7 is a top view of the special form of collar employed to hold the fork on to the cutter shank. Fig. 8 is a side view of the same.

Referring to the various figures wherein like reference characters designate like parts, the numeral 1 indicates the beam; 2, the plow; 3, 4 and 5, the wheels of a common type of riding plow. An adjustable lever 6 is also provided.

On the beam 1 of the plow, some distance in front of the plow point, is located a combined clamp and bracket composed of the two members 7, clamped to said beam by the bolts 8. The lower ends of the clamp members 7 contain the apertures 9, said apertures forming bearings for a socket shank 10. One end of the shank 10 forms a socket 11 to receive a stalk-cutter shank 12, and the other end is adapted to receive the lever 13 held in place by the set-screw 14.

The upper end of the lever 13 is enlarged and provided with an aperture 15, adapted to receive one end of a bolt 16. In front of the combined clamp and bracket, just described, is mounted a second clamp and bracket composed of a clamp and bracket member 17, a clamp piece 18 and the clamp bolts 19. The upper end of the bracket 17 is enlarged and provided with an aperture 20 adapted to receive the other end of the bolt 16. On the bolt 16, between the lever 13 and the bracket 17, is interposed a compression spring 21, held normally under a slight compression by the bolt 16.

It is obvious that if a greater pressure be exerted on the spring 21 by the lever 13, than that due to the normal compression of said spring, the lever 13 will move along the bolt 16 in the direction of the bracket 17, until said compression equals the pressure exerted by the lever 13. The upper end of the stalk-cutter shank 12 is adjustably carried by the socket 11, and is held in position in said socket by the set-screw 22. The lower end of the shank 12 is reduced in diameter so as to form a shoulder 23. The reduced portion being adapted to pass through an aperture in the central portion of the stalk cutter fork 24. The fork 24 is pivotally held in position between the shoulder 23 and a set collar 25. The set collar 25 is provided with two stops 26, adapted to engage a lug 27 cast integral with the under side of the fork 24. The lug 27 and the stops 26 limit the rotation of the fork 24, on the shank 12, to an arc of about 180 degrees.

The ends of the fork 24 carry suitable apertures to receive the ends of an axle 28. On the axle 28 is rotatably mounted the hub 29, from which radiate the arms 30. The arms 30 carry on their outer ends the knives 31, held in place by the shoulders 32 and the rivets 33. In the central portion of the fork, and on its forward side are cast the two lugs 34 and a bracket 35. Apertures in said lugs 34 form bearings for a stalk hook 36, allowing said hook 36 to rotate through a partial revolution. The stalk hook 36 is bent to form a slight off-set 37, adapted to receive a bolt 38. The bolt 38 passes through the off-set portion 37, the bracket 35, a compression spring 39, and receives on its upper end the adjusting nut 40. The clamping members 7 and the clamp and bracket 17 and 18 are adapted to various adjustments along the plow beam 1, which adjustment controls the amount of compression of the spring 21, also the position of the cutter wheel with reference to the point of the plow 2. The shank 12 is adapted to various adjustments in the socket 11, thus controlling the depth of cut of the knives 31 with reference to the plow 2. The action of the above-described stalk-cutter shank and fork is similar to that of the ordinary caster coulter, the method of connecting the fork of the cutter with the shank being the same in either case.

The operation of the stalk-cutter attachment serves to cut the stalks or other refuse, which may be on the ground, into small pieces just ahead of the plow, and at the same time that the plowing operation is going on. Also should an unusual obstruction be encountered by the blades of the cutter, during said operation, they will exert sufficient pressure on the spring 21, transmitted through the fork 24, the shank 12, the socket 11, the shank 10, and the lever 13, to compress said spring 21, which allows the cutter to pass over said obstruction. The compression of the spring 21 returns the cutter to its normal position after it passes said obstruction.

The purpose of the stalk hook 36 is to aline any stalks that may be on the ground so that the knives will strike them transversely. The spring 39, together with the bracket 35, the bolt 38 and the off-set 37 on the stalk hook 36, is employed to maintain said stalk hook 36 normally in the position shown. However, should an unusual obstruction be encountered, the hook will be displaced to the rear, thus compressing the spring 39. After the hook points pass the obstruction, the compression of the spring 39 will return said stalk hook 36 to its normal position.

It is obvious that various changes may be made in the forms and proportions of the various parts of this invention without departing from the spirit thereof. The invention is therefore presented as including all such modifications as come within the scope of the following claims.

What I claim is:

1. In a stalk-cutter attachment for plows, the combination with a pivotally connected cutter shank and fork and an axle carried by the ends of said fork, of a central hub mounted on said axle and having radially disposed blade carrying arms, a stalk hook rotatably attached to the forward portion of the cutter-fork, a spring-pressed means for maintaining said stalk hook normally in an operative position, and a spring-pressed means for maintaining the cutter normally in an operative position.

2. In a stalk-cutter attachment for plows, the combination with a pivotally connected cutter shank and fork and an axle carried by the ends of said fork, of a central hub mounted on said axle and having radially disposed arms, radially projecting knives attached to said arms in such a way that their plane is parallel to and adjacent to the axis of said hub, a stalk hook rotatably attached to the forward portion of the cutter fork, a bracket on said fork acting together with an off-set on the stalk hook for utilizing the compression of a spring to maintain said stalk hook normally in an operative position, and spring pressed means for maintaining the cutter normally in an operative position.

3. In a stalk-cutting attachment for plows, the combination with a pivotally connected cutter shank and fork and an axle carried by the ends of said fork, of a central hub mounted on said axle and having radially disposed arms, radially projecting knives attached to said arms, having their cutting edges parallel to the axis of said hub and a stalk hook rotatably attached to the forward portion of the fork.

4. In a stalk-cutter attachment for plows the combination with a pivotally connected cutter shank and fork and an axle carried by the ends of said fork, of a central hub mounted on said axle and having radially disposed arms, radially projecting knives attached to said arms, having their cutting edges parallel to the axis of said hub and a stalk hook rotatably attached to the forward portion of the fork, a cutter shank socket, said cutter shank socket being adapted to adjustably receive said cutter shank, a socket shank being rigidly secured to said cutter shank socket, a lever, said lever being rigidly and substantially vertically fastened to said socket shank, two brackets, said brackets being clamped upon the plow beam and being adapted to at their lower portion form bearings for said socket shank, two bracket members—said bracket members being rigidly fastened to the plow-beam and being spaced from the aforesaid two brackets, one of said bracket members having an upwardly projecting arm, a rod, and a coiled spring, said coiled spring being mounted upon said rod and being interposed between said lever and said bracket member having an upwardly projecting arm.

In testimony whereof I have signed my name to this specification in the presence of two subscribing witnesses.

JOHN E. OSBORNE.

Witnesses:
D. C. RAMSEY,
J. S. MURRAY.